United States Patent [19]

Burke

[11] 4,023,004

[45] May 10, 1977

[54] MICROWAVE OVEN POWER SUPPLY AND OSCILLATOR THEREFOR

[75] Inventor: Robert Virgil Burke, Fort Wayne, Ind.

[73] Assignee: Litton Systems, Inc., Huntington, Ind.

[22] Filed: July 16, 1975

[21] Appl. No.: 596,439

[52] U.S. Cl. .......................... 219/10.55 B; 323/18

[51] Int. Cl.[2] .......................... H02B 9/06

[58] Field of Search ............ 219/10.55 B, 10.55 R; 323/18, 19, 24, 34, 38; 307/252 VA

[56] References Cited

UNITED STATES PATENTS

| | | | |
|---|---|---|---|
| 3,633,095 | 1/1972 | Hood | 323/18 |
| 3,735,237 | 5/1973 | Derby | 219/10.55 B X |
| 3,780,252 | 12/1973 | Crapuchettes | 219/10.55 B |
| 3,939,319 | 2/1976 | Tamano et al. | 219/10.55 B |

*Primary Examiner*—Arthur T. Grimley
*Attorney, Agent, or Firm*—Ronald M. Goldman

[57] ABSTRACT

The specification presents an improved microwave oven power supply of the type which contains a transformer having a primary and high voltage secondary winding, a rectifier and capacitor combination connecting the high voltage secondary winding to a microwave magnetron and a control switching means, such as a Triac, is included in series circuit with the transformer primary to control current through the primary. In combination therewith a pulse generator is employed to control the operation of the switching means; providing voltage pulses to the switching means essentially to turn the switching means on and off for predetermined intervals. The improvement provides in the combination a pulse generator that contains a single control member accessible to the user, which varies or adjusts the width or duration of the pulses applied to the control switch means and concurrently varies or adjusts the time base or time period in which such pulses reoccur, suitably expanding the pulse duration concurrently with expansion of the time base, and vice versa. In an additional novel combination a synchronizer and an AND gate are connected in circuit with the pulse generator so that the concurrence of a synchronizing pulse from the synchronizer and a control pulse from the pulse generator must coincide in time before the Triac control switch means may be started.

19 Claims, 6 Drawing Figures

MICROWAVE OVEN POWER SUPPLY AND OSCILLATOR THEREFOR

BACKGROUND OF THE INVENTION

My invention relates to an improved power supply circuit for a microwave oven and, more particularly, to an improved adjustable supply for controlling the average microwave power generated by the oven magnetron.

The microwave oven is a known appliance used to heat or cook food by exposure to microwave energy. The microwave energy is generated by a microwave tube, typically a magnetron, which converts DC power to high frequency microwave energy, usually at 915 or 2,450 megahertz. In turn, the DC energy is supplied through the power supply which converts the line voltages and frequencies, 120-volts 60-hertz AC found in the home, to the higher voltage levels, typically on the order of 3,000 to 4,000 volts required for operation of available magnetrons. In early microwave ovens the power supplies provided certain fixed levels of voltage which, when matched with a particular magnetron, provided fixed average input powers. By way of example, 650 watts has been an average input level to the magnetron set by the designer's choice. More recent microwave ovens contain a control accessible to the user to permit the average input power to the magnetron to be adjusted to any power between "low" power and "high" power, 300 to 650 watts by way of example. That adjustment allows the user to essentially tailor the cooking speed and power level with the type of food to be heated or cooked. The benefits of this control is known and obvious and need not be discussed here.

An existing circuit for the foregoing type of adjustment appears in the Litton microwave oven manufactured by the Litton Industries, Litton Microwave Cooking Division, Minneapolis, Minnesota, and Model No. 416 sold under the tradename "Vari-Cook". That known control circuit employs a Triac-type controller. For low power levels the magnetron is fed by a pulse of current of predetermined width. At larger power levels the width of this pulse is expanded. I further understand that a switch is provided in the circuit so that when the control is advanced to the full power position, the switch operates to close a circuit to keep the Triac in the On condition. A printed electrical schematic circuitry or explanation of such prior circuit might be available from the manufacturer or a schematic diagram may be derived by inspection of the oven components.

Thus, by way of illustration, if the magnetron is pulsed with a certain peak level of current for a certain period of time, say 100 milliseconds, with a period or time base of 1,000 milliseconds, an average power is obtained which is the power provided to the magnetron over the time period. By increasing the time in which the peak current is supplied to the magnetron within that time base period, such as by doubling the duration of the pulse, say to 200 milliseconds, the average power supplied to the magnetron is effectively doubled.

The aforecited Litton oven of course contains a power supply which includes a high voltage transformer for transforming the line voltage up to the voltage level required for operating the magnetron, contains a separate filament transformer for stepping down the line voltage to the level required by the heater of the magnetron, includes a rectifier circuit for rectifying the AC from the high voltage of the output of the transformer to the DC voltage required by the magnetron and contains the aforedescribed controller in the primary circuit of the high voltage transformer, all of which are known.

In the foregoing oven, the magnetron is operated at its proper input current level for a certain duration and then is turned off for another duration to in effect vary the "duty cycle" of magnetron operation so that the average output power from (and input power to) the magnetron varies as a function of the ratio of On time to the total of On time plus Off time. Two additional prior art circuits as have been made known to me pertinent to this mode of power control appear in patents to Kappenhagen, U.S. Pat. No. 3,332,036, and to Noda, U.S. Pat. No. 3,862,390.

Kappenhagen shows a control for varying the On time of an oscillator with inverse variation of the Off time so that the average power to the oscillator is varied and in which the total time base of On and Off time is essentially constant. Noda is especially pertinent by way of background to my invention in that Noda suggests the use of a pulse generator having a first control to adjust the Off time of the magnetron while maintaining the On time constant—in effect to change the average power input by varying the time base or repetition rate of the pulse generator and a second control for varying the On time of the magnetron while maintaining the Off time constant—similarly in effect to change the average power input by varying the time base, which is equal to the sum of the On and Off times, of the multivibrator type oscillator. Thirdly, it appears recognized that by the manipulation of both controls it is possible to vary both the On time and the Off time of the oscillator in Noda so as to increase the On time and decrease the Off time to obtain a specified power input and to keep the oscillator time base constant in the manner of Kappenhagen. This is obviously impractical inasmuch as the ordinary consumer must act as a computer in an attempt to figure out which combination of the two control settings provides the desired average magnetron power to properly cook the food within a period of time set upon the oven's main timer, which must also be selected.

Thus Noda, while showing the possibility of two controls suggests that one be set at a prescribed level. Moreover, while the structure of Noda is cumbersome to operate, it also requires two separate adjustable controls which obviously results in a more expensive structure than otherwise might be available as in my invention and overlooks the combination of elements that I believe promotes the life of the power supply elements such as the power transformer.

While the aforedescribed prior art design of a power supply for permitting variable power levels to the magnetron exists, it is recognized that an improvement to the oven combination is made if the reliability of the combination is enhanced. Moreover, conservation of natural resources is promoted if a design like the present invention is invented which reduces the number of components in the oven controller circuitry while providing the same or improved results.

OBJECTS OF THE INVENTION

It is thus an object of my invention to provide a microwave oven power supply having a power control adjustment of a novel and innovative design that uses fewer components than the known pre-existing design, thereby to conserve natural resources and reduce manufacturing cost. In an additional aspect of my invention, my invention provides a power supply of the type having means for permitting user adjustment of magnetron power level that probably enhances the useful life of the oven and permits more reliable service than with the prior designs.

SUMMARY OF THE INVENTION

Briefly, in the combination of a magnetron, a high voltage transformer having a primary and secondary, and a rectifier capacitor combination for converting AC from the secondary to the DC required by the magnetron, a power controller is provided that contains a Triac for controlling the current into the primary of the transformer, and pulsing means are provided for controlling the Triac. The pulsing means contains adjusting means for permitting simultaneous adjustment of the current pulse width or duration of the current into the transformer primary and the time base or frequency of occurrence of such current pulses so that by means of a single control member accessible to the user, the user adjusts the time base and the current pulse width, essentially increasing or decreasing both.

In a further aspect of my invention, synchronizing means and a modified logic AND gate are combined in the combination. The synchronizing means provides pulses related in time to the phase of the AC line voltage and the output of the synchronizer and the pulsing means are combined in the AND gate so that the Triac is not switched until the pulses are coincident to ensure that each primary current pulse does not commence until the appearance of a synchronizing pulse.

In a still further aspect the invention includes a pulse generator of the multivibrator type and includes an operational amplifier having an inverting and a noninverting input, an output, a voltage divider having a positionable tap coupled to the noninverting input as well as a resistor or feedback circuit coupling the output to the noninverting input, an R-C timing network coupled between the output of the operational amplifier and the voltage supply, and means coupling the output of the R-C timing circuit to the inverting input of the operational amplifier whereby adjustment of the voltage divider tap in one direction decreases the frequency and increases pulse width or, viewed in an alternative way, increases the time base of the oscillator while simultaneously increasing the output pulse width; and vice-versa for adjustment of the tap in the opposite direction.

The foregoing objects and advantages as well as the structure characteristic of my invention is better understood by giving consideration to the detailed description of the preferred embodiments thereof which follow in this specification, taken together with the figures of the drawings.

DESCRIPTION OF THE PREFERRED EMBODIMENT

Figure 1:
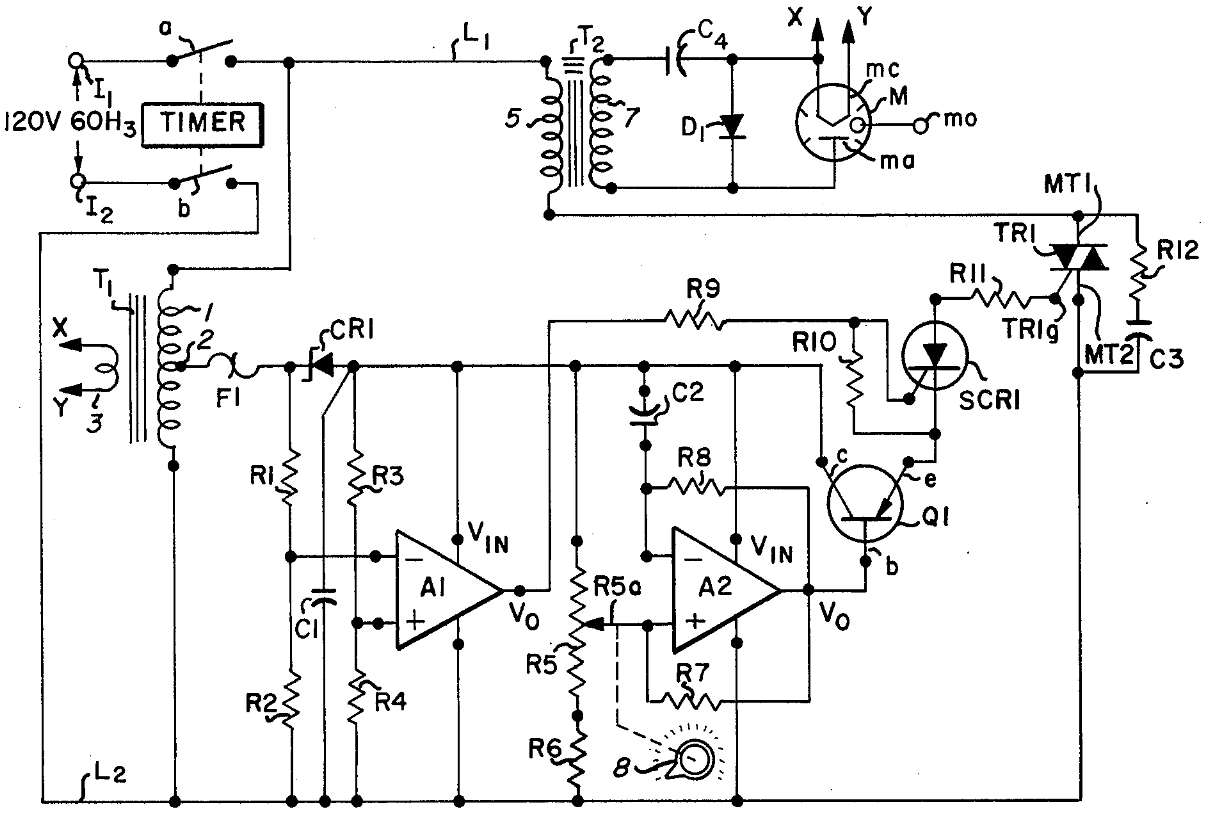
FIG. 1 is a schematic illustration of a first embodiment of the invention.

The illustration of the preferred embodiment in FIG. 1 is presented in an electrical schematic form using conventional symbols for the known component elements which are assembled together to form the unique power supply and pulse generator of my invention. The graphical symbols used are well understood by those skilled in the art and the use of those symbols avoids the necessity of illustrating mechanical details not necessary to an understanding of the invention. A source of AC power, such as 120 volts AC RMS 60 hertz supplied by the electrical utility company, may be connected, directly or indirectly through ancillary circuits and switches found in conventional ovens, to the input terminals $I_1$ and $I_2$ of this circuit. A timer, symbolically illustrated, has its contacts a and b connected in series circuit between terminal $I_1$ and lead $L_1$, and terminal $I_2$ and lead $L_2$, respectively. A first transformer $T_1$ is included which contains a primary winding 1, a tap 2 in the primary winding, and a low voltage secondary winding 3. A second transformer $T_2$ is provided and contains a primary winding 5 and a secondary winding 7. $T_2$ is a conventional high voltage transformer, one in which the ratio of the turns of insulated wire in the secondary to that in the primary is quite large, on the order of 25 to 1. Suitably, transformer $T_2$ is of the conventional high leakage reactance type in which the primary and secondary windings are mounted spaced apart essentially side by side on a magnetic core so as to be "loosely coupled".

The secondary winding of transformer $T_2$ is connected to the known rectifier circuit including rectifier diode $D_1$ and capacitor $C_4$. The magnetron M is connected in shunt of diode $D_1$ with the anode $M_a$ of the magnetron connected in circuit with the diode cathode of the magnetron cathode $M_c$ in circuit with the diode anode so that the magnetron and the diode are in circuit oppositely electrically poled. The magnetron output $M_o$ may be coupled to the oven cooking chamber, not illustrated. The winding ends X and Y of secondary 3 of transformer $T_1$ are connected to the corresponding X-Y heater-cathode terminals of magnetron M, but the electrical leads are omitted for clarity.

Primary 5 of $T_2$ is connected in electrical series circuit with the main terminals $MT_1$ and $MT_2$ of a Triac $TR_1$ across the power lines $L_1$ and $L_2$. A series circuit consisting of resistor $R_{12}$ and capacitor $C_3$ is connected in shunt across the Triac to form a transient voltage suppressing circuit which protects the Triac from being inadvertently triggered by such transients.

The Triac is a known type of semiconductor switching device which is triggered to the current conducting condition by a high or low pulse at its gate electrode, TRIG, and subsequently conducts current through its $MT_1$, $MT_2$ terminals, which current may pass through the Triac in either direction, until the level of current falls to zero and at that moment the device automatically switches "off". Another voltage pulse must be applied to the gate in order to reinitiate the Triac to a current conducting or On condition.

A fuse $F_1$, or fusible wire, is connected between tap 2 of transformer $T_1$ and the cathode terminal of a Zener diode $CR_1$. A first voltage divider network consisting of series resistors $R_3$ and $R_4$ are connected in circuit between the anode of diode $CR_1$ and line $L_2$. A second voltage divider network consisting of resistors $R_1$ and $R_2$ are connected in series between the cathode of diode $CR_1$ and lead $L_2$. A capacitor $C_1$, suitably an electrolytic type, is connected from the anode ends of $CR_1$ and line $L_2$.

The triangle $A_1$ represents an operational amplifier, such as is familiar to those skilled in the art, denoted a linear amplifier with differential input and push-pull output. This is commercially available in an integrated circuit chip or package and contains many semiconductor elements necessary to perform the function of the device. Examples include UA1458 and UA747, manufactured by the Fairchild Semiconductor Company. The operational amplifier includes a noninverting input denoted by the plus + sign, and an inverting input denoted by the minus − sign, an output denoted by $V_o$, and power connections or powering device including the $V_{in}$ input and the $C_{om}$ ground terminals.

The inverting input is connected to the juncture of resistors $R_1$ and $R_2$ and the noninverting input is connected in circuit with the junctures of resistors $R_3$ and $R_4$ of the respective voltage divider networks. The $C_{om}$ input is connected to line $L_2$, which forms a circuit common or reference location, and the $V_{in}$ input is connected in circuit with the anode end of Zener diode $CR_1$. The output of operational amplifier $A_1$ is connected in series circuit with a resistor $R_9$ to the gate electrode of a silicon output rectifier, $SCR_1$, which is hereinafter described in greater detail. The voltage divider networks and operational amplifier $A_1$ combine to form what I term a synchronizer to provide a series of synchronizing pulses as explained in the description of the operation of the invention.

The silicon controlled rectifier $SCR_1$ is a conventional electronic switching device which once enabled by a voltage high at its gate electrode conducts current thereafter in a direction from its anode to its cathode, irrespective of the removal of the enabling voltage high at its gate electrode, and thereafter continues to conduct current only so long as the current does not fall to zero, in which event it automatically switches off and cannot switch "on" again to conduct current until another enabling voltage high is applied at its gate.

A resistor $R_{10}$ is connected between the cathode terminal and the gate electrode of $SCR_1$ to ensure reverse voltage blocking. A transistor $Q_1$ is provided, suitably an PNP type. The emitter, *e*, thereof is connected to the cathode end of $SCR_1$ and the collector, *c*, is connected in circuit with the anode end of diode $CR_1$. A resistor $R_{11}$ is connected in series between the anode of $SCR_1$ and the gate electrode of Triac $TR_1$ providing a current limiting function. As hereinafter becomes more apparent, the $SCR_1$ functions as a "modified" logic AND gate to control operation of Triac $TR_1$.

A third resistor voltage divider network consists of a resistive potentiometer $R_5$ and a resistor $R_6$ which are connected in series circuit between the anode end of Zener diode $CR_1$ and line $L_2$. Potentiometer $R_5$ contains a movable tap, $R_{5a}$.

A second operational amplifier $A_2$ is provided which is of the same structure as operational amplifier $A_1$ previously referred to and described. Typically, both $A_1$ and $A_2$ are available on a single integrated circuit chip. Operational amplifier $A_2$ thus contains the power input $V_{in}$ and ground terminals $C_{om}$ necessary to connect a power source to the device, a noninverting input denoted by the plus sign, an inverting input denoted by the minus sign, and an output denoted as $V_o$. The power input terminal $V_{in}$ is connected in circuit with the anode end of $CR_1$ and the ground terminal $C_{om}$ is connected to line $L_2$. A resistor $R_7$ is connected between output $V_o$ and the noninverting input of operation amplifier $A_2$ and a second resistor $R_8$ is connected between the output $V_o$ and the inverting input of amplifier $A_2$. Output $V_o$ is further connected to the base, *b*, of transistor $Q_1$. A capacitor $C_2$ is connected between the anode end of diode $CR_1$ and the inverting input of operation amplifier $A_2$. Finally, the tap $R_{5a}$ of resistor potentiometer $R_5$ is connected to the reference input of $A_2$. The elements comprising $R_5$, $R_6$, $C_2$, $R_8$, $R_7$ and operational amplifier $A_2$ are arranged to form a novel multivibrator type of oscillator, which I regard as an invention, that has the characteristics of providing both a variable pg,14 pulse width output as well as a variable output time base or repetition rate, as variously termed, and with both the pulse width and time base being adjusted by positioning of a single control, the tap of potentiometer $R_5$.

Other conventional circuits, such as the interlock circuits, normally found on a conventional microwave oven may be included and, of course, other elements which are employed either as choice or which are necessary to the operation and complete structure of a microwave oven may similarly be included but are not illustrated or disclosed since they are available in the prior art and are not necessary to an understanding of the invention or its operation.

With a source of 120 volts AC applied across terminals $I_1$ and $I_2$ and timer contacts *a* and *b* closed to leads $L_1$ and $L_2$, current flows from the source through primary 1 of transformer $T_1$ and by transformer action the voltage is "stepped down" in level and appears across secondary 3 as a low voltage AC suitable for the magnetron heater. Current passes from secondary 3 in a series circuit through the heater-cathode terminals X-Y of the magnetron to heat the magnetron cathode. A low AC voltage of suitable level appears at primary tap 2. An AC current flows through fuse $F_1$, through the voltage divider network $R_1$ and $R_2$ and lead $L_2$ back to an end of primary 1 to establish a low reference AC voltage level at the juncture of resistors $R_1$ and $R_2$, equal to $$V_{tap}\left(\frac{R_2}{R_1 + R_2}\right).$$

This reference AC voltage is applied to the inverting − input of operational amplifier $A_1$ via the illustrated lead. In addition the voltage at tap 2 is rectified by the unidirectional current conducting characteristics of diode $CR_1$ to a direct or DC voltage and supplies a charging current to capacitor $C_1$. Capacitor $C_1$ charges up to the appropriate low DC voltage level. This establishes a negative DC voltage at the anode end of diode $CR_1$. A DC current flows from the anode end of $CR_1$ through series connected resistors $R_3$ and $R_4$ and produces a voltage drop across $R_4$. The voltage across resistor $R_4$ at the juncture of resistors $R_3$ and $R_4$ is taken as a reference voltage and applied to the noninverting input of operational amplifier $A_1$.

As becomes apparent, a positive ground system is employed. Hence when I refer to "low" I mean a high negative voltage and when I refer to a voltage "high" I mean a voltage that is more positive than the low, such as zero or ground potential.

Inasmuch as the voltage at the junctures of $R_1$ and $R_2$ is of a sinusoidal AC nature, its instantaneous magnitude varies from zero to a positive peak, then to zero, and then to a negative peak, and to zero again during the time or period of each AC cycle. At a frequency of 60 hertz, each such cycle takes about 16.6 milliseconds. The level of voltage at the noninverting input of $A_1$ is adjusted through both the location of the tap on the transformer and the resistances of resistors $R_3$ and $R_4$ so as to provide a voltage incremently below the peak voltage of the AC as would appear at the juncture of the first voltage divider network $R_1$ and $R_2$, inasmuch as I desire to produce a synchronizing pulse in each AC cycle that is synchronized in time with the negative peak voltage of the AC input. When the voltage at the inverting input of $A_1$ attains the negative peak of the sine wave AC voltage incremently above the DC voltage level at the noninverting input of operational amplifier $A_1$, the amplifier switches its output $V_o$ from low or negative voltage to a more positive voltage, such as ground potential, or high, and as soon as the AC at the inverting input drops below this peak level the output of amplifier $A_1$ reverts or switches back to a negative or low output level. Thus during the time that operational amplifier $A_1$ is switched to high and then switched off, a high pulse is formed and this pulse is applied via resistor $R_9$ to the gate electrode of silicon controlled rectifier $SCR_1$. Thus $SCR_1$ is conditioned to switch into its on or current conducting state if a source of voltage is connected across the anode and cathode thereof. With the line AC being of a frequency of 60 hertz, the pulses from $A_1$, synchronized in time with the negative peak of the AC voltage, are produced at a rate of 60 times per second. Obviously other choices of synchronizing may be made, such as described in the patent to Crapuchettes, U.S. Pat. No. 3,780,252, so as to produce a synchronizing pulse at a time during each AC cycle corresponding to a different point of the voltage sine wave and suitable adjustment of the resistance values $R_1$, $R_2$, $R_3$ and $R_4$, or replacement of either $R_1$ or $R_2$ with a suitable capacitor, may be made to accomplish this.

The pulse generator comprising the elements $R_5$, $R_6$, $C_2$, $R_8$, $R_7$ and $A_2$, previously described, is supplied with a negative DC operating voltage over the lead connected to the anode of diode $CR_1$. Hence DC is applied to the $V_{in}$ terminal of amplifier $A_2$ and a DC current flows through resistors $R_5$, $R_6$ and $R_7$ to produce a DC voltage at tap $R_{5a}$ equal to the voltage or IR drop across the lower half of $R_5$ ($R_{5b}$) and $R_6$ in parallel circuit with $R_7$. The voltage at noninverting input voltage may be approximated by the mathematical expression:

$$V_{in} \frac{(R_{5b}+R_6)}{\left[\left(\frac{R_{5a}\cdot R_7}{R_{5a}+R_7}\right)+R_{5b}+R_6\right]} \quad (\text{when } V_o \approx V_{in})$$

and when $V_o$ is approximately zero (high), the voltage at that noninverting input may be approximated by the expression:

$$V_{in}\left[\frac{\left[\frac{(R_{5b}+R_6)\,R_7}{R_{5b}+R_6+R_7}\right]}{\left[R_{5a}\frac{(R_{5b}+R_6)\,R_7}{K_{5b}+R_6+R_7}\right]}\right] \quad (\text{when } V_0 \approx 0))$$

In the illustrated configuration, the output $V_o$ is normally at a high (approximately zero volts) initially after the power is applied to the circuit. The pulse generator provides an output at the output $V_o$, normally zero volts, and then is switched to a large negative voltage or low that lasts for a predetermined duration, referred to as a pulse of a predetermined width, and this pulse reoccurs periodically at a set rate or, stated another way, is repeated within each predetermined period of time, referred to as a "time base". The manner in which the circuit functions to produce such negative pulses is described hereinafter in connection with the description of this unique circuit. The pulses produced by the pulse generator are applied to the base of transistor $Q_1$. The DC voltage at the anode of diode $CR_1$ is applied to the collector of transistor $Q_1$. The emitter has applied a zero voltage indirectly from Triac $TR_1$, via the gate, resistor $R_9$, the cathode of $SCR_1$ and the anode thereof. When the output of $A_2$ switches to low at the commencement of its output pulse the transistor is properly biased to conduct current from its emitter and collector circuits. In so doing, a current conducting path is completed between the Triac $TR_1$ gate electrode, the resistor $R_{11}$, and SCR and transistor $Q_1$. Accordingly, upon the appearance of one of the synchronizing pulses at the gate electrode of $SCR_1$, the SCR switches to its On or current conducting condition. It is noted that SCR once initiated remains on for the duration of the pulse provided from the pulse generator to the base of transistor $Q_1$ and transistor $Q_1$ serves as part of the pulse generating circuit essentially as an isolation or buffer switch between the amplifier $A_2$ and $SCR_1$. In this sense the SCR functions as a modified AND gate in that it does not conduct current until coincidence of the input from the synchronizer and the input pulse from the pulse generator and thereafter continues to conduct current until the voltage pulse from pulse generator $A_2$ terminates, even though the synchronizing pulse at the gate electrode has terminated.

$SCR_1$ conducts current making the gate TRIG of the Triac a suitable high negative voltage and Triac $TR_1$ switches to its on or current conducting condition. Because of the inherent high switching speeds in these devices, current through the series circuit between lead $L_1$, primary 5 of transformer $TR_2$, Triac $TR_1$ to lead $L_2$ commences when the AC voltage thereacross is at essentially the negative peak level. Triac $TR_1$ is a bidirectional current conducting device. Current flows first in one direction, reduces to zero, and flows then in the other direction from between leads $L_1$ and $L_2$ to cycle alternating current through the primary winding 5 of transformer $TR_2$. It is noted that $TR_1$ does not switch off even though the current reduces to zero because its gate TRIG has the enabling voltage applied throughout this time. The AC across the primary of $T_2$ is stepped up and appears across secondary 7 as the high voltage required. The voltage is rectified and partially doubled by the rectifier $D_1$ capacitor $C_4$ combination to provide a pulsating high voltage DC to the magnetron M in a known manner and the magnetron converts the DC current therethrough between its anode and cathode to the microwave frequency energy that appears at its output $M_o$, and the output at $M_o$ is conveyed by means not illustrated to the oven chamber, also not illustrated, of the microwave oven.

The Triac continues to conduct current on both half cycles of AC until the voltage is removed from its gate electrode TRIG.

At the conclusion of the pulse from operational amplifier $A_2$ the voltage at the base of transistor $Q_1$ is switched to a high or zero volt level and transistor $Q_1$ switches to its Off or noncurrent conducting condition. This interrupts the current path from the cathode of $SCR_1$ to the DC on the line from anode of diode $CR_1$, and $SCR_1$ switches off. With the bias voltage removed from its gate TRIG, Tricac $TR_1$ continues to conduct the AC current through its anodes until the current reduces to zero at the completion of the next AC half cycle and then automatically switches off. Accordingly the current through primary 5 ceases and anode voltage is no longer supplied to the magnetron. In turn, the magnetron ceases to generate microwave energy.

After the lapse of a predetermined time and at the commencement of the next time base period, the pulse generator again provides a low output to switch transistor $Q_1$ on. Similarly the synchronizing circuit provides a pulse and $SCR_1$ is again turned on as is Triac $TR_1$ and current again flows through primary 5 and the Triac for the duration of the output pulse from pulse generator $A_2$. Anode voltage is supplied to the magnetron which thereupon generates microwave energy. At the conclusion of the pulse, Triac 1, $SCR_1$ and transistor $Q_1$ are again turned off so as to block further current through the primary winding of $TR_1$ and the magnetron again shuts off. After the lapse of a predetermined period this operation again repeats and continues to operate in that manner until the AC is removed from leads $L_1$ and $L_2$.

At the conclusion of the time set upon the timer controlled switch, the timer opens its contacts *a* and *b* to interrupt current to the circuits so that the circuits cease their function. Thus not only is the average power level of the magnetron output controlled but the time over which this power is applied is also controlled.

Ideally, the shaft of the potentiometer $R_5$ is connected to a control member, knob 8, symbolically illustrated, located at the front control panel of the microwave oven, accessible to the oven user, so that the user may selectively adjust the voltage at the noninverting input of operational amplifier $A_2$. By moving potentiometer tap $R_{5a}$ to a different position, for example to a lower voltage position, the pulse generated is adjusted to supply a pulse output of a different duration or width than in the preceding position, and to simultaneously vary the time base or repetition rate, as variously termed, in which these output pulses are repeated. In the oscillator in the preferred embodiment, reducing the voltage at the noninverting + input of $A_2$ concurrently causes the generation of a pulse output of greater width and increases the time period in which this pulse is generated. Conversely by increasing the voltage at the noninverting input, the output pulses are of shorter duration and repeat in a shorter period of time or, as otherwise termed, at a greater repetition rate. Moreover, by advancing the tap to the lowest, i.e. most negative voltage, position the time base and pulse width becomes infinite. That is, the pulse generator simply switches on and remains on allowing continuous operation. This is ideal for the highest power operation of the magnetron and avoids the need for a separate switch to hold the Triac on for full power operation.

It is clear that various modifications may be made to the foregoing embodiment. For example, one may short out directly $SCR_1$ which would eliminate the function of the synchronizing circuit and also eliminate the synchronizing circuit entirely so that the Triac is controlled directly by the pulse generator. However the synchronizing circuit provides a benefit, according to my design, in that the Triac $TR_1$ is not turned on until the AC voltage across the transformer primary is at a negative peak value. This reduces the in-rush currents that are generated along the lines $L_1$ and $L_2$ to a minimum value. However, if in-rush currents are not of concern, then the pulse generator circuit of my invention may be used alone to control Triac $TR_1$. Secondly, $CR_1$ may be an ordinary diode instead of a Zener diode. However the Zener affords protection for the components of the circuit in that if the voltage along the +DC lead builds up to a level that is greater than that recommended for the operational amplifiers, current will flow in the reverse direction to maintain the voltage at the anode end of $CR_1$ at a maximum or lesser value. Thus the Zener type diode is obviously preferable. Thirdly, although I show the elements of the invention as discrete electrical components, it is apparent to those skilled in the art that may discrete components may be fabricated on a single semiconductor chip through conventional integrated circuit processes. Thus it is anticipated that many of the elements shown as discrete components will appear in but a single integrated circuit chip as further development work is made in order to reduce cost of components and of assembling those components in a circuit. Fourthly, if magnetron M is of the type that does not employ a heater or filament or which does not need filament heat to make the cathode sufficiently emissive, then transformer $T_1$, provided primarily to supply current to the magnetron heater, may be omitted. In that event, a suitable resistor voltage divider is connected across leads $L_1$ and $L_2$ in the place of primary 1 so as to produce the proper supply voltage for the circuits at a suitable juncture in the divider network and the lead fuse $f_1$ is connected to that juncture. Other alternative arrangements are apparent.

If one compares the prior art type of controllers which, as in the present case, varied the duration of the pulses in order to vary the average power level to the magnetron but at a fixed rate, whereas in the case of my invention, as the pulses are varied in duration the rate of repetition of these pulses is also varied so that at increasing power levels a longer duration pulse is provided as well as a lower repetition rate or longer time base. Thus I have provided a circuit requiring fewer electrical components at substantial projected increased savings in costs fabrication, and I also increase the reliability of the entire oven circuit in that at the higher power levels the lower repetition rate is used and this substantially decreases the voltage stress on the high voltage transformer $TR_1$. When one applies a voltage step function to an LC circuit, such as the transformer, it causes transients that create added turn-to-turn voltage stresses in the transformer winding across the wire insulation. By widening the time base at higher power levels through my unique circuit the power to the high voltage transformer is not turned on and off as frequently as would be the case in the prior art design having a constant time base. Thus the electrical stresses on the insulation in the transformer windings is reduced with consequent projected increase in life and reliability of the transformer and thus in life and reliability of the microwave oven itself. By similar analogy, with the reduction in number of On-Off operations, the stresses caused by transient voltage generation in the rectifier and magnetron are also reduced and this is more pronounced in those magnetrons in which filament heating is not employed. With the latter types of magnetrons the high voltage is applied across the magnetron creating electron heating of the cathode and there is a one-tenth of a second to one second delay before the magnetron commences to generate microwave energy. This creates stresses in the magnetron, so that by increasing the time base as well as the pulse width under higher power conditions, the number of On-Off cycles creating those stresses is reduced. Conversely, at lower power levels with shorter pulses and a higher repetition rate, the magnetron is repeatedly switched on before the cathode has had a chance to fully cool down, thus minimizing the stress on such magnetron. It is recognized that other oscillators, including multivibrator type oscillators, may in accordance with the teachings of my novel combination be employed in this combination. These other oscillators will likewise be modified or required to have the desired property illustrated in the preferred embodiment of permitting the user to simultaneously adjust the time base and the pulse width of the output so that as the control is advanced for higher power the width of the control pulses increases and the time base of the pulse also increases or, as otherwise stated, the repetition rate at which the pulses reoccur, taken on a per minute basis, decreases. Similarly, as the control is adjusted for lower power the pulse width decreases and the time base decreases or, as otherwise put, the repetition rate for example, expressed in pulses per minute, increases. Thus, for example, the more expensive multivibrator type oscillator disclosed in Noda, U.S. Pat. No. 3,862,390, may be modified and used in accordance with my invention in one manner by mechanically ganging together the two controls, variable resistors $R_{30}$ and $R_{32}$, in a manner that both the On time and the Off time may both be simultaneously increased with the resistance tapers of the selected variable resistors being matched to provide appropriate On and Off periods commensurate with the power level settings on the single user accessible control member.

Figure 2:
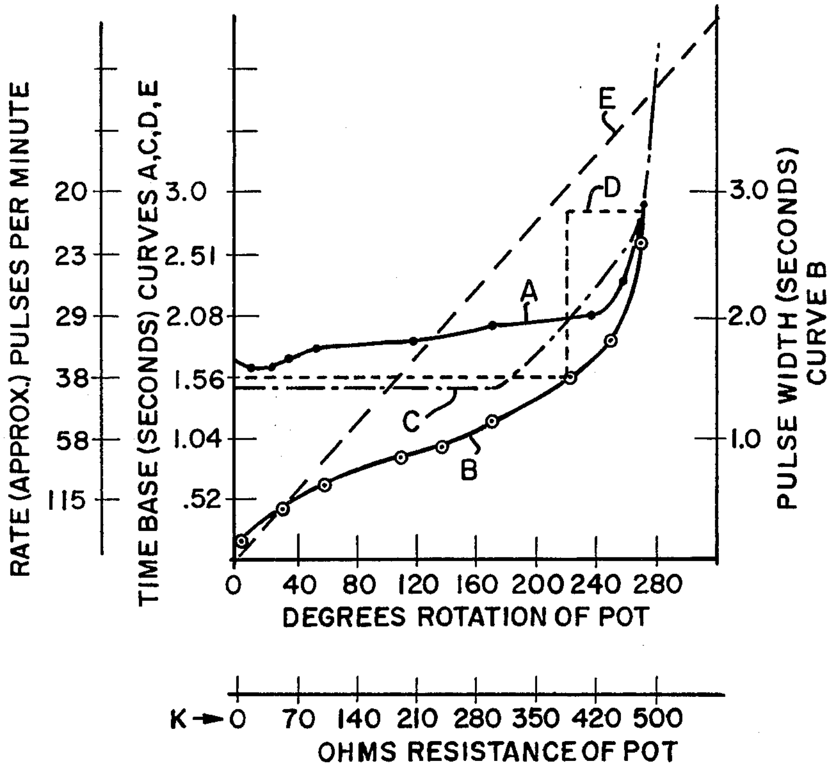
FIG. 2 illustrates the variation and power level and frequency in one practical embodiment of the invention.

To assist the reader, reference is made to FIG. 2 which illustrates the variation of the time base and repetition rate change in Curve A and the variation of pulse width in Curve B calculated approximately for one practical embodiment as a function of the degrees of rotation of the potentiometer shaft, and hence as a function of the resistance level of the potentiometer. From this curve it is seen that the pulse width increases with the rotation of the potentiometer while the time base increases slightly with potentiometer shaft rotation and then increases rather rapidly at the larger angles of rotation shown as 240° in the example of the control knob.

Figure 3:
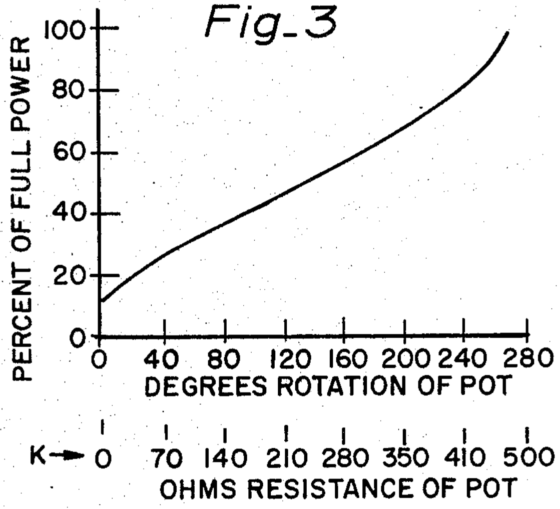
FIG. 3 illustrates in greater detail the elements of a multivibrator type oscillator or pulse generator.

FIG. 3 illustrates the average power in percent of full power as a function of the shaft rotation of the potentiometer $R_5$ in one practical embodiment. In comparing FIGS. 2 and 3 it is seen that at the higher power levels the time base and pulse duration are larger than at the lowr power levels.

Ideally the highest repetition rate would occur at the lowest power level, but due to the practical circuit's imperfections this rate occurs at an average power level somewhat above minimum.

Making reference again to FIG. 2, two additional Curves C and D are provided, both of which are hypothetical plots of time base versus potentiometer shaft rotation. Thus for example, it is possible to construct a pulse generator in which the pulse width changes with potentiometer or other control knob position, as in Curve B, but in which the time base remains constant until a certain control knob position and then increases at a linear rate. By like reasoning and in accordance with the teachings of my invention it is possible to devise a pulse generator having a single control knob or member accessible to the user which permits adjustment of the pulse width in the manner of Curve B and in which the time base remains esentially constant and then steps up or jumps to a discrete larger time base at a point in the positioning of the control member, as illustrated by Curve D. Curve E illustrates a time base that varies linearly with angular positioning of the control member and is described hereinafter in connection with FIG. 6. In generalizing, many variations in the combination may be employed in accordance with the object of employing shorter pulse width and a shorter time bae at the low power levels, at a larger pulse width and a larger time base at the higher power levels, to minimize stress on the high voltage transformer, the magnetron, and related components to thereby enhance reliability and useful life of the microwave oven in which may novel power supply is employed.

The Triac as an electronic switch connected in series with the primary of the transformer acts as a valve to turn on or turn off the AC current through the primary winding and the other circuits function as a control or enabling means to turn on or off that electronic switch. In effect, the enabling means provides an output pulse of a certain duration once in each time base period and repeats that to turn on the semiconductor switch essentially for that duration in each time base period. Moreover, by the adjustment of the potentiometer tap both the time base and pulse duration are concurrently changed to different values selectively with the time base increasing as the pulse duration is increased and vice versa.

Though of a seemingly subtle nature, it is my belief that any innovation such as the foregoing, which increases the reliability and life of other components within the oven, such as the transformer, by reducing undesired stresses, serves to advance the useful arts. And, more particularly, in the inclusion of the novel oscillator of my invention for this purpose, reaps an even greater reward in that the components are reduced in number from that in prior art designs signficantly and result in a lowering of manufacturing costs with obvious attendant advantage to a lower cost to the purchaser of these microwaver ovens, and in reducing the need for components greater conservation of our ntural resources.

Figure 4:
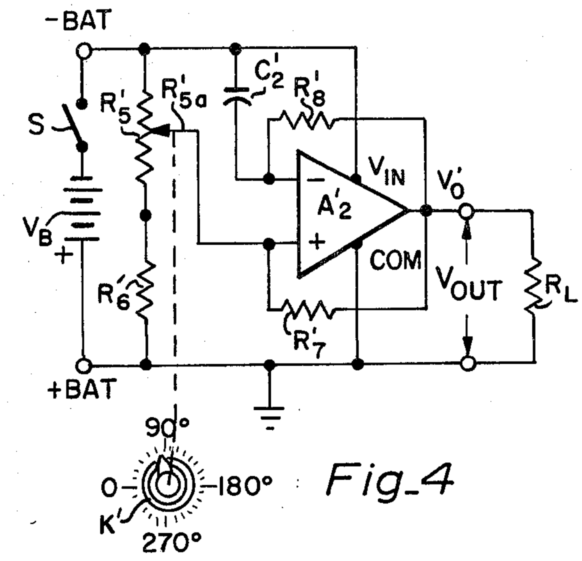
FIG. 4 illustrates some variations in oscillator output to assist the reader to understand the operation of the invention.

The oscillator employed in the oven power supply of FIG. 1 is separately presented in the form of an electrical schematic drawing in FIG. 4. Where the same connections and elements are used in this figure they are identified by the same number primed, as used to identify the elements in FIG. 1. The output of the operational amplifier $A_2$ is connected as shown to a symbolic resistive load RL and the voltage out is measured across the terminals as indicated. Moreover, as a substitute for the DC source employed in FIG. 1, I employ a DC source such as a battery, VB, of suitable voltage level connected across the terminals as the source of power in series with a normally open switch S, analogous to the timer switch in the oven power supply. The negative polarity terminal of the battery is connected through the contacts of switch S to the −BAT terminal and the positive polarity battery terminal is connected to the +BAT terminal and the associated electrical lead. For purposes of this embodiment, the lead to terminal +BAT is considered the reference potential or ground, as variously termed. The operational amplifier $A_2'$is a known integrated circuit device having a differential input with a push-pull output as earlier described in this specification.

As illustrated, resistor $R_7$ is connected between amplifier output $V_o'$and the amplifier's noninverting input + and resistor $R_8'$ is connected between output $V_0'$ and the inventing input − of the amplifier. The capacitor $C_2'$ is connected between the inverting input and −BAT. Finally the voltage divider consisting of potentiometer resistor $R_5'$ and resistor $R_6'$ in series circuit is connected between −BAT and the reference ground. A control member, knob $K_1$, accessible to the user, is connected to the shaft of the potentiometer as indicated by the dash lines, to permit user adjustment of the tap $R_{5a}'$ position by rotation of the angular position of the knob.

The DC source negative terminal is connected to the power input $V_{in}$ and the $C_{om}$ terminal connected to the reference ground connection of amplifier $A_2'$ as is illustrated to provide power for the amplifier and to apply a DC voltage across the series connected resistor $R_6'$ and resistor potentiometer $R_5'$ connected between the −BAT terminal and reference ground. The DC current through the voltage divider establishes a voltage at adjustable tap $R_{5a}'$ that is proportional to the resistance level at the tap with respect to reference ground. This establishes a reference voltage at tap $R_{5a}'$ which is applied to the noninverting input of amplifier $A_2'$. The amplifier output is at zero volts or thereabout in the Off condition until the voltage applied to its inverting − input equals or exceeds the voltage applied to its noninverting input +. When the voltage to the inverting input equals the reference voltage, the output $V_0'$ of the operational amplifier switches to a low, a negative voltage output. This output remains at low until the voltage at the inverting input falls below the level of voltage at the noninverting input whereupon the amplifier output switches back to a zero state or high. Assume that the tap on potentiometer $R_5'$ of the voltage divider network is set at a given level as selected by the user by positioning the control knob. Once switch S closes to connect the battery to leads −BAT and +BAT, at time $t=0$, a certain negative voltage is presented at the = amplifier input via the potentimeter, as depicted by Curve 1 of FIG. 5B, and the voltage applied to the−input by capacitor $C_2'$ is lower, as depicted by Curve 1 of FIG. 5A, so the output of amplifier is high, as depicted by FIG. 5C, and amplifier is considered in its Off state. Resistor $R_8'$ and capacitor $C_2'$ form a timing network and this governs the switching of operational amplifier $A_2'$ between its two states, both during an On cycle and the Off portion of a cycle. A first charging current path exists for the capacitor from ground (+BAT), amplifier $A_2$ internally, output $V_0$ and resistor $R_8'$, so that the voltage at the amplifier inverting input, let us say VNR, varies logarithmically with time, as $V.e^t/RC$, while the voltage at the + input is relatively constant. This initial charging cycle with the capacitor connected as shown results in a relatively long initial delay or inhibit period at most settings of potentiometer $R_5$ (time T01 in FIG. 5A). This is advantageous in the circuit of FIG. 1 in that it allows the filament transformer $T_1$ to supply heater current to the magnetron for an interval before the high voltage via transformer $T_2$ is applied to the magnetron. This allows the magnetron to have its cathode heated to some extent and avoids in part the cold start operation which places greater stress on the magnetron. Quite coincidentally the delay is greater at the lower power settings of the potentiometer than at the higher power settings. The delay, TO, after power turn-on varies in duration inversely to changes in the pulse width. Thus the smaller the pulse width, the larger the delay.

At some point in time the voltage to which capacitor $C_2'$ becomes charged causes the − input voltage to equal the voltage at the noninverting input. At this time the operational amplifier switches to its On condition and its output $B_0$ goes from essentially zero volts, a high, to a low voltage such as −17 volts. This changes the voltage at the noninverting input + to a high negative voltage as depicted in FIG. 5C. Further, with output $V_0$ at −17 volts, capacitor $C_2'$ commences to discharge, i.e. become more negative, with time and may be characterized mathematically by a logarithmic expression. The discharge current goes from the capacitor, resistor $R_8'$, output $V_0$, the amplifier $A_2'$, out COM, to +BAT, ground.

Again at some point in time, depicted as $T_5$ on Curve 1 in FIG. 5A, the voltage at capacitor $C_2'$ applied to the inverting input decreases below the voltage at the reference input and the operational amplifier switches again into it Off state in which its output is at essentially zero. This difference between the time that the operational amplifier switched to its On condition and then to its Off condition determines the pulse width of the negative voltage pulse applied across RL and in the operation of the power supply of FIG. 1 determines the time in which transistor Q1 is in its On condition.

The previously described cycle of operation in which capacitor C is charged is repeated. However since we are now in the steady state period the time in which capactitor C charges to the value necessary to cause $A_2'$ to switch its state is less than the time to do so initially when the power is first applied to the circuit. Thus at some point in time again the voltage at the inverting input becomes greater than the voltage at the noninverting input and the operational amplifier again switches to the On condition. The difference in time between the time that the operational amplifier switches On until the next time that the amplifier switches On is referred to as the time base. Without going into unnecessary detail as the setting of the tap is moved upwardly to increase the resistance the pulse width of the 17 volt output pulse increases and simultaneously the time base increases from that in the preceding setting. At the highest setting of potentimeter $R_5$ the time base expands out to infinity, eliminating the need of a switch to perform this function. With the potentiometer in that position, once the amplifier switches to its on state, the capacitor $C_2$ is unable to discharge to a lower level than the voltage at the noninverting input, due to inherent slight voltage drops in the circuit. The amplifier thus remains in that state until power is removed. It is noted that if the time base increases, the number of such pulses as will occur in a minute, 60 second period, decreases so it may be said that the pulse rate decreases. Similarly by moving the potentiometer to a lower resistance value than that initially established, the period in which the operational amplifier is switched to its On condition in each period or cycle of operation is reduced and, moreover, the time base is decreased. With the time base decreased, of course, a greater number of such pulses occurs in any given period, such as a minute, and the pulse repetition rate is said to increase. In one practical embodiment the voltage source supplies −17 volts, the potentiometer varies in resistance from zero to 500,000 ohms, resistor $R_6$ is 39,000 ohms, $R_7$ is 150,000 ohms, $R_8$ is 1,000,000 ohms, capacitor C is 0.1 microfarads, and the operational amplifier is a UA1458 Model manufactured by Fairchild Company, Mountain View, California.

In contrast to the aforedescribed operation, it is noted that the pulse generator can be modified to be switched into its on state upon initial application of power to the circuit by simply placing capacitor $C_2'$ between the − input and reference ground. This is not desirable in the power supply of FIG. 1 for the reasons discussed.

Figure 5:
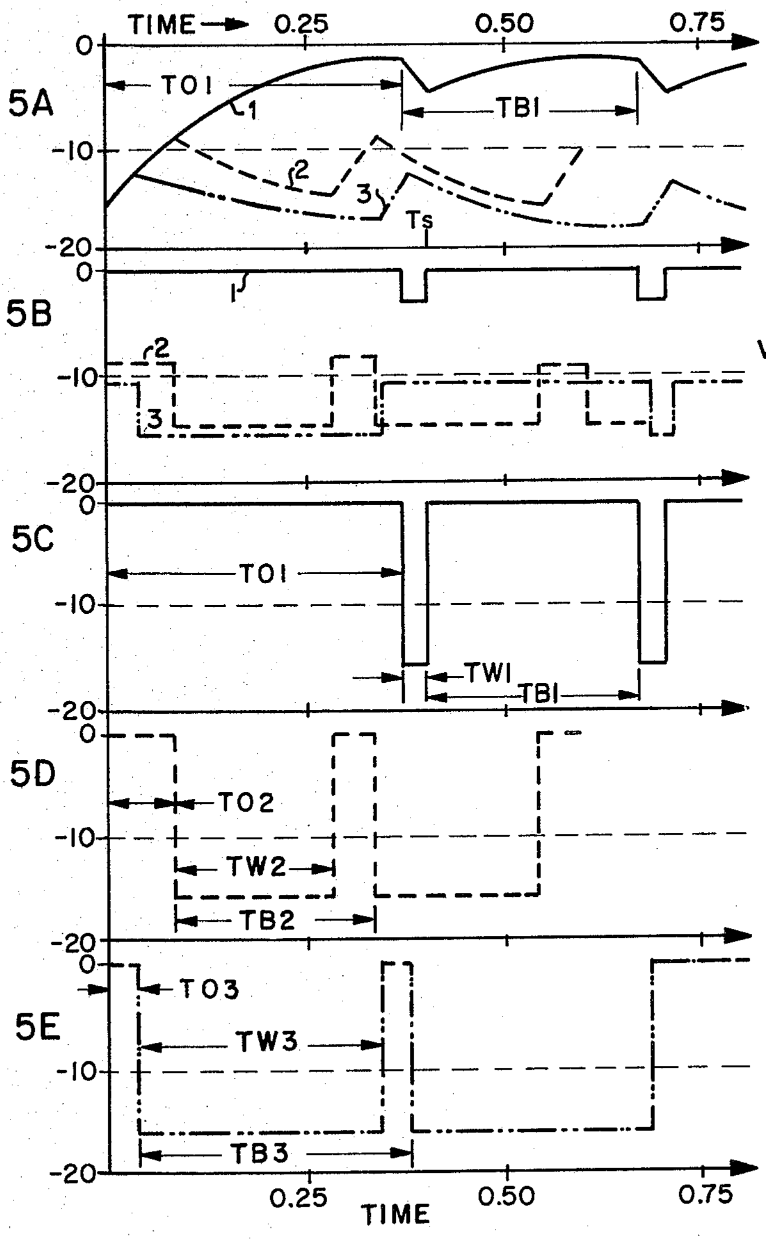
FIG. 5 illustrates examplary voltage wave forms which occur in the operation of the multivibrator type oscillator.

In connection with the foregoing description of the novel oscillator, FIG. 5 presents exemplary voltage wave forms which occur in the operation of the multivibrator type oscillator and which is believed to be helpful to full understanding of the mode of operation thereof. Initially it is noted that the illustrated voltage wave forms were prepared based on theoretical calculations and will differ in degree from that presented by observation of the performance of an actual practical embodiment of that invention using the electronic instrument known as an oscilloscope, familiar to those skilled in the art. FIG. 5A illustrates the voltage wave form presented at the inverting point of $A_2$ under conditions of minimum power and highest repetition rate. FIG. $5_{A2}$ illustrates the sawtooth wave form presented at that same location under conditions of about 75 percent power and approximately the same repetition rate. Curve 3 of FIG. 5A illustrates the wave form and voltage level at the same location, the inverting input of $A_2$, under conditions of about 90 percent power and an approximate time base of 350 milliseconds. In this figure in connection with Curve 1 I have designated the initial turn-on time of the multivibrator oscillator previously described as $T_{01}$. Additionally I have dimensioned the time base of a complete cycle of operation as $T_{bl}$ in connection with Curve 1. FIG. 5B illustrates waveforms at noninverting input of operational amplifier $A_2'$ under the same three conditions of operation described in connection with FIG. 5A. Thus the voltage wave forms are similarly labeled as 1, 2and 3. FIG. 5C illustrates the output of $A_2'$ under the first condition of operation which corresponds to the preceding Curve 1. For convenience I have labeled the width of the output pulse as $T_{w1}$, the time base as $T_{bl}$ and the initial turn-on delay as $T_{01}$, the latter two of which correspond in time with that designated in Curve A of FIG. 5A. FIGS. 5D and 5E represent the output of $A_2$ under conditions corresponding to that of Curves 2 and 3, respectively, in FIGS. 5A and 5B. Likewise I have labeled the initial delay as $T_{02}$, the pulse width as $T_{w2}$ and the time base as $T_{b2}$ in FIG. 5D and I have labeled the initial turn-on delay as $T_{03}$, the pulse width as $T_{w3}$, and the time base as $T_{b3}$ in FIG. 5E. Thus comparing the three output wave forms in FIGS. 5C, 5D and 5E corresponding to conditions of operating power in the oven of low power, 75 percent power and 90 percent power, respectively, or simply considered as corresponding to three positions of potentiometer tap $R_{5a}$ in FIG. 4, there is graphically demonstrated the change in the pulse width between low and high power operation as well as the increase in the time delay base. Likewise it is clear that the initial turn-on delay is much greater under the conditions of operation for Curve 5C.

Figure 6:
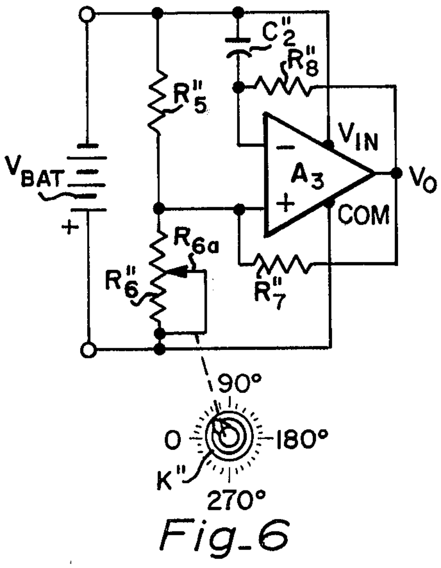
FIG. 6 illustrates another variation of a multivibrator type oscillator.

Another variation in the structure of a multivibrator type oscillator is schematically illustrated in FIG. 6. As before, an operational amplifier $A_3$ is provided which is of the same type as amplifier $A_2$ discussed in connection with the oscillator of FIG. 4. A resistor $R_8''$ is connected between the inverting input − and the output $V_0$ of $A_3$, a second resistor $R_7''$ is connected between the output $V_0$ and the noninverting input + of $A_3$. The negative polarity terminal of the DC voltage source, $V_B$, is connected by a lead to the power input terminal $V_{in}$ of the amplifier $A_3$ and a capacitor $C_2''$ is connected between the negative polarity terminal of the battery and inverting input −. The amplifier common, $C_{om}$, is connected to the positive polarity terminal of battery $V_B$ via a lead. A resistor voltage divider network consisting of series connected resistors $R_5''$ and $R_6''$ is connected across the positive and negative polarity terminals of the battery. Variable resistor $R_6''$ is a potentiometer type having a positionable tap. The tap $R_{6a}$ of the potentiometer is connected in circuit to one side of the resistor so as to shortcircuit a portion of the resistor. The shaft of variable resistor $R_6''$ is connected to a knob K''. The juncture between resistors $R_5''$ and $R_6'$ is connected to the noninverting input of amplifier $A_3$ as shown. With power applied to the circuit, the oscillator provides suitable pulses at its output $V_0$. As the position of the tap is varied by changing the angular position of knob K'', the resistance of $R_6''$ is changed, changing the resistance of the series network and hence changing the voltage drop across $R_6''$. Thus the voltage which appears at the juncture of the resistor network is raised or lowered so as to change the voltage at inverting input − and, accordingly, the pulse width and the time base of the oscillator changes. With this circuit arrangement for selecting the voltage applied to the reference input + it is found that a linear relationship exists between the time base of the oscillator and the potentiometer position which, by way of example, I illustrate as Curve E of FIG. 2.

It is believed that the oscillator of the invention may find other application where it is desired to perform a similar function in combination. Similarly, with modern technology, although discrete components are used in many locations, it is possible to fabricate these resistors and capacitors on an integrated circuit chip so as to reduce the number of parts that must be handled to a minimum. As was illustrated in the circuit of FIG. 1, the oscillator in combination provides many unique advantages of a practical and useful nature as compared to the prior art devices.

It is believed that the foregoing description of the preferred embodiments of my invention is sufficient to enable one skilled in the art upon reading this specification to make and use the invention. However, it is expressly understood that my invention is not to be limited to those details inasmuch as many variations, modifications and substitutions of equivalents, some of which were discussed in the preceding specification, suggest themselves to one skilled in the art upon reading this specification, all of which incorporate the spirit, function and result of my inventions. Accordingly it is expressly requested that my invention be broadly construed within the full spirit and scope of the appended claims.

What I claim is:

1. An improved power supply for a microwave oven of the type which includes:

a high voltage transformer, said transformer having a primary winding and a secondary winding;

a magnetron;

means coupled to said secondary winding of said transformer and said magnetron for providing a DC current to said magnetron;

a primary winding;

a Triac;

means connecting said primary winding of said transformer and said Triac in series circuit across an AC voltage source;

the improvement comprising in combination:

synchronizing means for providing a voltage pulse at an output responsive to the AC voltage from said source attaining a predetermined instantaneous level;

adjustable pulse generator means, said pulse generator means for providing at an output a series of voltage pulses of a predetermined duration at a predetermined rate of occurrence, and adjusting means for simultaneously changing said pulse duration and said rate of occurrence thereof;

a positionable control member coupled to said adjusting means of said pulse generator means accessible to the user for adjusting concurrently said pulse duration and said rate of occurrence thereof as a function of the position of said control member; and gate means, said gate means responsive to each coincidence of an output pulse from said pulse generator means and a pulse from said synchronizing means for enabling said Triac to conduct current and responsive to the termination of each said output pulse from said pulse generator for permitting said Triac to restore to a noncurrent conducting state.

2. The invention as defined in claim 1 further including timer controlled switch means connected in electrical series circuit with said AC source for completing said series circuit to said source only during the period of operation of a timer associated therewith.

3. The invention as defined in claim 1 wherein said gate means comprises:

a semiconductor controlled rectifier;

means connecting said gate electrode of said semiconductor controlled rectifier to the output of said synchronizing means;

means connecting said anode of said SCR in circuit with the gate electrode of said Triac; and means connecting said cathode of said SCR in circuit with the output of said pulse generator; whereby once said SCR is enabled by concurrent application of an output from said pulse generator and said synchronizing means said gate remains in the On condition until termination of the output of said pulse generator.

4. The invention as defined in claim 1 wherein said pulse generator means includes inhibiting means for initiating a first one of said voltage pulses of a predetermined duration only after the lapse of an initial delay period equal to or greater than said predetermined duration of said voltage pulses.

5. In a microwave oven of the type having a magnetron responsive to DC current for generating microwave energy, a high voltage transformer having a primary and a high voltage secondary winding; and means, including rectifier means, connected between said secondary winding and said magnetron for supplying DC current to said magnetron;

electronic switching means, said electronic switching means coupled in series circuit with said primary winding across an AC source for controlling current flow through said primary;

the improvement comprising in combination therewith:

adjustable enabling means for repetitively enabling said electronic switching means to the current conducting condition for a duration once in each time base period, said enabling means including adjusting means to change said duration to different lengths and to change said time base period to different lengths; and a control member accessible to the user of said oven coupled to said adjusting means for setting said adjusting means to simultaneously adjust the length of said duration and said time base period;

whereby the average power supplied to said magnetron may be varied in level by the user.

6. The inventin as defined in claim 5 wherein said adjusting means produces an increase in the duration of said time base period with an increase in said duration of said enabling of said electronic switching means.

7. The invention as defined in claim 6 further comprising switch means connected in series with said AC source for completing said circuit, and wherein said adjustable enabling means further contains means for inhibiting the initial operation of said enabling means for an inhibiting interval subsequent to closure of said switching means, said inhibiting interval being a function of said adjustment of said control means.

8. The invention as defined in claim 7 wherein said microwave oven further contains timer means and means coupling said timer means to said switch means for controlling operation of said switch means.

9. In a microwave oven of the type having a magnetron responsive to DC current for generating microwave energy, a high voltage transformer having a primary and a high voltage secondary winding; and means, including rectifier means, connected between said secondary winding and said magnetron for supplying DC current to said magnetron;

electronic switching means, said electronic switching means coupled in series circuit with said primary winding across an AC source for controlling current flow through said primary;

the improvement comprising in combination therewith:

adjustable enabling means for repetitively enabling said electronic switching means to the current conducting condition for a predetermined duration once in each predetermined time base period, said enabling means including means to adjust said duration and said time base period; and a control member accessible to the user of said oven for setting said adjusting means to simultaneously adjust the length of said predetermined duration and said predetermined time base period;

whereby the average power supplied to said magnetron may be varied in level by the user;

and wherein said adjustable enabling means includes:

an operational amplifier, said operational amplifier having first and second terminals for connection to a DC source, a reference input, an inverting input and an output;

a resistive voltage divider network having first and second ends and an adjustably positionable tap for connection to various resistive positions in said network intermediate said ends to adjust said duration and said time base period;

first resistor means connected between said output and said reference input;

second resistor means connected between said output and said inverting input;

capacitor means;

means connecting one end of said capacitor to said inverting input;

means applying a DC voltage across said voltage divider network across said first and second power input terminals of said operational amplifiers, and to the remaining end of said capacitor means.

10. The invention as defined in claim 9 further comprising synchronizing means for preventing operation of said electronic switch means until the instantaneous voltage of said AC source is of a predetermined volt, said synchronizing means including:

an operational amplifier, said operational amplifier having a reference input, an inverting input and an output;

a first resistive voltage divider network;

a second resistive voltage divider network;

means for connecting a DC voltage across said first voltage divider network and means for connecting said reference input to a circuit location in said first voltage divider network;

means connecting an AC voltage from said source across said second voltage divider network; and means for connecting a circuit juncture in said second voltage divider network to said reference input of said operational amplifier.

11. In a microwave oven of the type having a magnetron; a transformer; said transformer having a secondary winding and a primary winding; and means, including rectifier and capacitor means, coupled between said secondary winding and said magnetron for supplying pulsating DC voltage to said magnetron; and electronic switching means connected in series circuit with said primary winding for connection across an AC source, said switching means for gating the passage of AC current through said primary winding; and enabling means for enabling said electronic switching means, the improvement wherein said enabling means includes:

operational amplifier means, said operational amplifier means having an inverting input, a noninverting input, an output, a first terminal for connection to a first polarity terminal of a DC voltage source and a second polarity terminal for connection to a second polarity terminal of said DC source;

first resistor means connected in circuit between said output and said noninverting input of said operational amplifier means;

second resistor means connected between said output and said inverting input of said opertional amplifier means;

capacitor means connected between said inverting input and one of said first and second polarity terminals of said DC source;

resistive voltage divider means connected in circuit across said first and second polarity terminals of said source, for producing a voltage at an output, said output being connected in circuit with said noninverting input of said operational amplifier means, said divider means including adjusting means for selectively changing the voltage at said output; whereby a voltage pulse of a certain duration is produced in each time base period at the output of said operational amplifier and whereby positioning of said adjusting means adjusts both said time base and said pulse duration to increase or decrease both, and wherein at a position of said adjusting means the time base and pulse duration are expanded to an essentially infinite time.

12. The invention as defined in claim 11 wherein the one of said terminals to which said capacitor means is connected is said first polarity terminal of said DC source, whereby upon application of DC source to said enabling means an initial time delay is provided prior to the appearance of a first voltage pulse at said output.

13. The invention as defined in claim 12 wherein said resistive voltage divider network comprises a first resistor, a potentiometer resistor having a positionable tap, means connecting said first resistor and said potentiometer resistor electrically in series, and means coupling said positionable tap electrically to the output of said network.

14. In a microwave oven of the type having a magnetron; a transformer having a primary and a secondary and means, including rectifier and capacitor means, coupled between said secondary and said magnetron; and electronic switching means connected in series circuit with said primary for connection across an AC source, said switching means for gating the passage of AC current through said primary; and means for enabling said electronic switching means comprising: multivibrator type oscillator means for repetitively generating a pulse of predetermined duration in each predetermined time base interval, and positionable adjusting means connected therewith for expanding or contracting simultaneously the length of said pulse duration and said time base interval.

15. The invention as defined in claim 14 wherein said multivibrator type oscillator means includes means for initially delaying the generation of a first one of said pulse for an initial period of time equal to or greater than said predetermined pulse duration.

16. An improved power supply for a microwave oven of the type which includes:

a high voltage transformer, said transformer having a primary winding and a secondary winding;

a magnetron;

means coupled to said secondary winding of said transformer and said magnetron for providing a DC current to said magnetron;

a primary winding;

a Triac;

means connecting said primary winding of said transformer and said Triac in series circuit across an AC voltage source;

the improvement comprising in combination:

synchronizing means for providing a voltage pulse at an output responsive to the AC voltage from said source attaining a predetermined instantaneous level;

adjustable pulse generator means, said pulse generator means for providing at an output a series of voltage pulses of a predetermined duration at a predetermined rate of occurrence, and adjusting means for changing said pulse duration and said rate of occurrence thereof;

a positionable control member coupled to said adjusting means of pulse generator accessible to the user for adjusting concurrently said pulse duration and said rate of occurrence thereof as a function of the position of said control member; and gate means, said gate means responsive to each coincidence of an output pulse from said pulse generator means and a pulse from said synchronizing means for enabling said Triac to conduct current and responsive to the termination of each said output pulse from said pulse generator for permitting said Triac to restore to a noncurrent conducting state;

and wherein said pulse generator means comprises:

an operational amplifier, said operational amplifier having first and second terminals for connection to a DC source, a reference input, an inverting input and an output;

a resistive voltage divider network having first and second ends and an adjustably positionable tap for connection to various resistive positions in said network intermediate said ends;

first resistor means connected between said output and said reference input;

second resistor means connected between said output and said inverting input;

capacitor means;

means connecting one end of said capacitor to said inverting input;

means applying a DC voltage across said voltage divider network, across said first and second power input terminals of said operational amplifier and to the remaining end of said capacitor means.

17. The invention as defined in claim 16 wherein said DC source comprises rectifier filter means coupled to said AC source for providing rectified DC voltage across a first polarity terminal and a second polarity terminal; and wherein said remaining end of said capacitor is connected to the same one of said DC source terminals to which said first power input terminal of said operational amplifier is connected for providing an initial delay in the generation of pulses, subsequent to application of said AC source, of a duration equal to or greater than the duration of pulses from said pulse generator.

18. An improved power supply for a microwave oven of the type which includes:

a high voltage transformer, said transformer having a primary winding and a secondary winding;

a magnetron;

means coupled to said secondary winding of said transformer and said magnetron for providing a DC current to said magnetron;

a primary winding;

a Triac;

means connecting said primary winding of said transformer and said Triac in series circuit across an AC voltage source;

the improvement comprising in combination:

synchronizing means for providing a voltage pulse at an output responsive to the AC voltage from said source attaining a predetermined instantaneous level;

adjustable pulse generator means, said pulse generator means for providing at an output a series of voltage pulses of a predetermined duration at a predetermined rate of occurrence, and adjusting means for changing said pulse duration and said rate of occurrence thereof;

a positionable control member coupled to said adjusting means of pulse generator accessible to the user for adjusting concurrently said pulse duration and said rate of occurrence thereof as a function of the position of said control member; and gate means, said gate means responsive to each coincidence of an output pulse from said pulse generator means and a pulse from said synchronizing means for enabling said Triac to conduct current and responsive to the termination of each said output pulse from said pulse generator for permitting said Triac to restore to a noncurrent conducting state;

and wherein said gate means comprises:

a semiconductor controlled rectifier;

means connecting said gate electrode of said semiconductor controlled rectifier to the output of said synchronizing means;

means connecting said anode of said SCR in circuit with the gate electrode of said Triac; and means connecting said cathode of said SCR in circuit with the output of said pulse generator;

whereby once said SCR is enabled by concurrent application of an output from said pulse generator and said synchronizing means said gate remains in the On condition until termination of the output of said pulse generator;

and wherein said means for connecting said cathode to the output of said pulse generator comprises:

transistor means having emitter, base and collector;

means connecting the base of said transistor to the output of said pulse generator;

means connecting the emitter of said transistor and said collector in circuit between a voltage source and said cathode terminal.

19. An improved power supply for a microwave oven of the type which includes:

a high voltage transformer, said transformer having a primary winding and a secondary winding;

a magnetron;

means coupled to said secondary winding of said transformer and said magnetron for providing a DC current to said magnetron;

a primary winding;

a Triac;

means connecting said primary winding of said transformer and said Triac in series circuit across an AC voltage source;

the improvement comprising in combination:

synchronizing means for providing a voltage pulse at an output responsive to the AC voltage from said source attaining a predetermined instantaneous level;

adjustable pulse generator means, said pulse generator means for providing at an output a series of voltage pulses of a predetermined duration at a predetermined rate of occurrence, and adjusting means for changing said pulse duration and said rate of occurrence thereof;

a positionable control member coupled to said adjusting means of pulse generator accessible to the user for adjusting concurrently said pulse duration and said rate of occurrence thereof as a function of the position of said control member; and gate means, said gate means responsive to each coincidence of an output pulse from said pulse generator means and a pulse from said synchronizing means for enabling said Triac to conduct current and responsive to the termination of each said output pulse from said pulse generator for permitting said Triac to restore to a noncurrent conducting state;

and wherein said synchronizer means comprises:

an operational amplifier, said operational amplifier having a reference input, an inverting input and an output;

a first resistive voltage divider network;

a second resistive voltage divider network;

means for connecting a DC voltage across said first voltage divider network and means for connecting said reference input to a circuit location in said first voltage divider network;

means connecting an AC voltage from said source across said second voltage divider network; and means for connecting a circuit juncture in said second voltage divider network to said reference input of said operational amplifier.

* * * * *

UNITED STATES PATENT AND TRADEMARK OFFICE

CERTIFICATE OF CORRECTION

PATENT NO. : 4,023,004

DATED : May 10, 1977

INVENTOR(S) : Robert Virgil Burke

It is certified that error appears in the above-identified patent and that said Letters Patent are hereby corrected as shown below:

In Column 4, line 46, the word "of" should read -- and --. In Column 5, line 35, "output" should read -- controlled --. In Column 6, line 26, omit "Pg. 14". In Column 10, line 32, "may" (1st instance) should read -- many --. In Column 10, line 62, between "costs" and "fabrication" insert -- of --. In Column 12, line 4, "lowr" should read -- lower --. In Column 12, line 31, "bae" should read -- base --. In Column 12, line 36, "may" should read -- my --. In Column 13, line 3, "$A_2$" should read -- $A_2'$ --. In Column 13, line 21, "$R_7$" should read -- $R_7'$ --. In Column 13, line 24, "inventing" should read -- inverting --. In Column 13, line 60, "=" should be -- + --. In Column 14, line 27, "$B_O$" should read -- $V_O$ --. In Column 18, line 36, "inventin" should read -- invention --.

Signed and Sealed this

*Twenty-second* Day of *November 1977*

[SEAL]

*Attest:*

RUTH C. MASON
*Attesting Officer*

LUTRELLE F. PARKER
*Acting Commissioner of Patents and Trademarks*